No. 677,038. Patented June 25, 1901.
F. A. MERRICK.
CONTROL OF ELECTRIC MOTORS.
(Application filed Nov. 14, 1900.)

(No Model.) 2 Sheets—Sheet 1.

UNITED STATES PATENT OFFICE.

FRANK A. MERRICK, OF JOHNSTOWN, PENNSYLVANIA, ASSIGNOR TO THE LORAIN STEEL COMPANY, OF PENNSYLVANIA.

CONTROL OF ELECTRIC MOTORS.

SPECIFICATION forming part of Letters Patent No. 677,038, dated June 25, 1901.

Application filed November 14, 1900. Serial No. 36,476. (No model.)

*To all whom it may concern:*

Be it known that I, FRANK A. MERRICK, of Johnstown, in the county of Cambria and State of Pennsylvania, have invented a new and useful Improvement in Control of Electric Motors, of which the following is a full, clear, and exact description, reference being had to the accompanying drawings, which form a part of this specification.

My invention has relation to the control of electric motors, and is designed to provide a system of series-parallel control in which the change from series to parallel is made without the use of external resistance and by a series of steps which provide a nearly uniform acceleration in the speed of the motors, such steps being effected without at any time opening entirely the motor-circuit.

My improved system is in some respects similar to that described and claimed in my Patent No. 645,116, dated March 13, 1900, but differs therefrom in several important motor combinations, as will hereinafter appear.

It consists generally in a system of series-parallel control in which the change from series to parallel is effected by first connecting the fields of the motors in parallel and in series with the armatures, which are in series with each other, shunting one of the motors with the field of the other motor, then temporarily cutting the shunted motor out of circuit and immediately thereafter reconnecting it in circuit in such a manner that it is shunted by the armature of the other motor, and then again removing the shunted motor from the circuit and again connecting it in circuit in parallel with the first motor.

My invention also consists in the novel step or motor combination in which a motor is shunted by the field of another motor whose armature is also in circuit and is carrying the current of both the shunting-field and the shunted motor.

It also consists in the novel combination of steps or motor combinations and subcombinations thereof, all as hereinafter described and pointed out in the appended claims.

Figure 1:
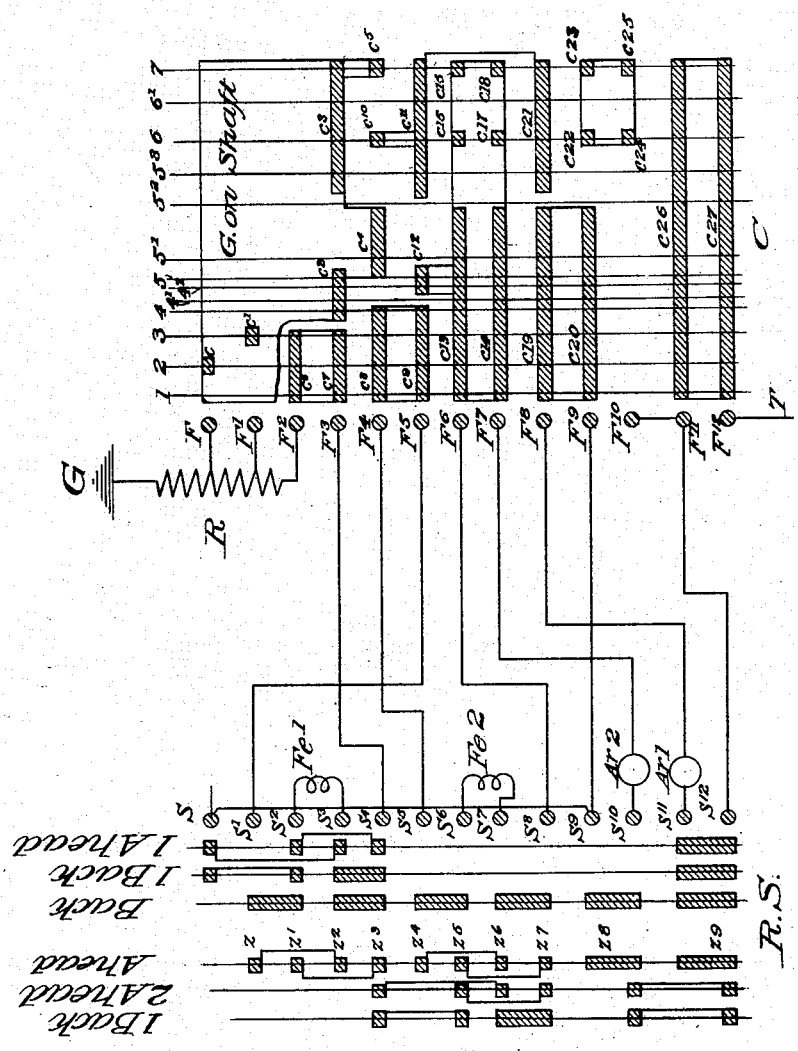
Figure 2:
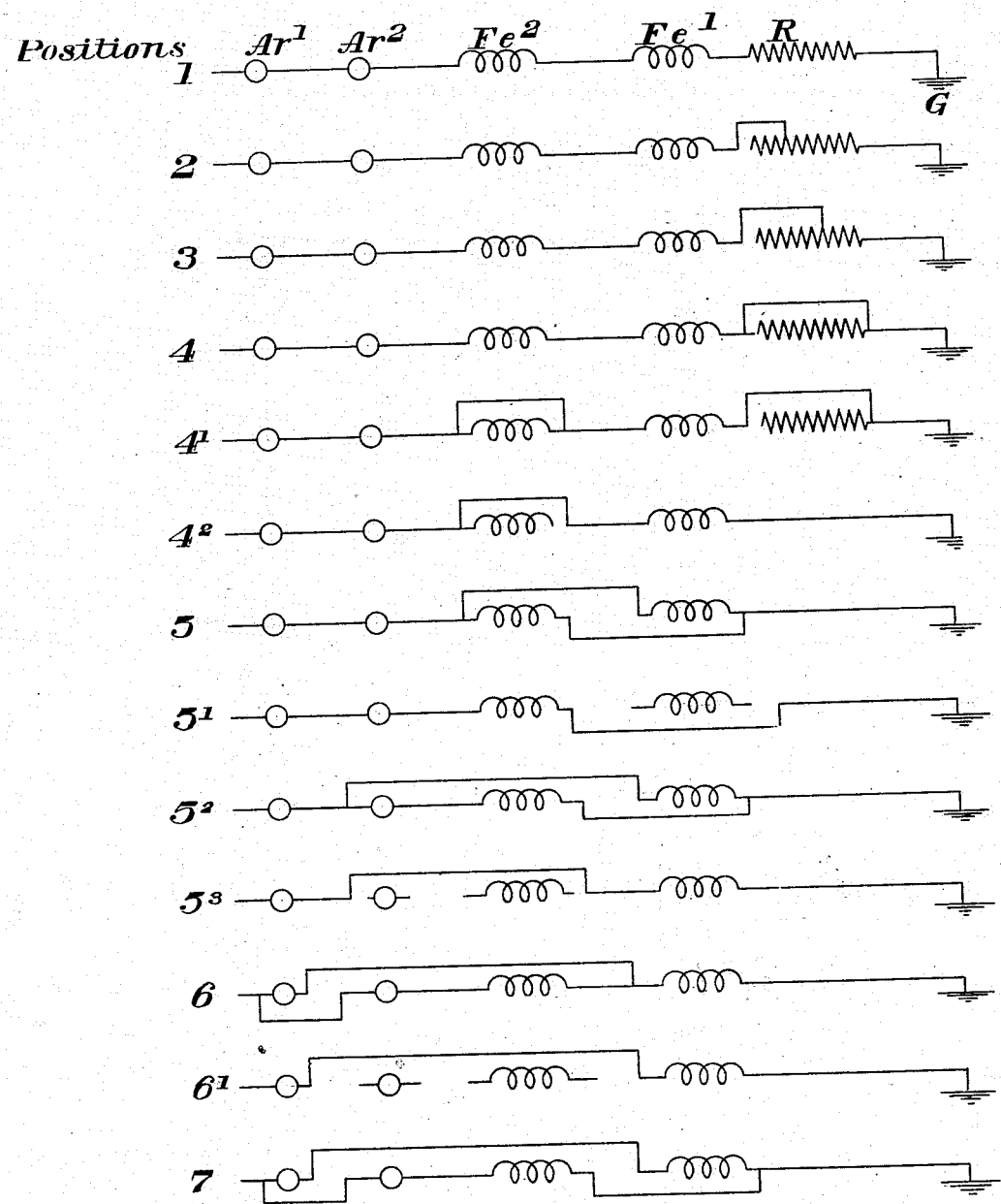

In the accompanying drawings, Figure 1 is a diagram showing a development of a controller and circuit connections such as may be employed in the practice of my invention, and Fig. 2 is a view showing graphically the motor combinations which are effected by the controller in its different positions and which constitute my improved method of motor control.

In the drawings two motors are shown, their armature and field coils being respectively designated as $Ar'$ $Ar^2$ and $Fe'$ $Fe^2$. The motor whose elements are designated $Ar'$ and $Fe'$ will hereinafter be referred to as "motor No. 1" and the other motor as "motor No. 2."

Referring now more particularly to Fig. 2, the first three positions represent the usual resistance-steps, which I prefer to employ in starting the motors, the external resistance used in these steps being designated R. Position 4 shows the motors in straight series, the resistance having been entirely removed, and is not again used until the controller reaches position 3 on its return movement. The next running position is that indicated at 5, in which the fields are connected in parallel and in series with the connected armatures. The effect of this position is of course to reduce by approximately one-half the total ohmic resistance of the fields, and thereby proportionately reduces their strength relatively to the armatures, each of which carries the current of both fields, and a corresponding increase in speed results. To pass from position 4 to position 5, it is necessary, of course, to remove one of the fields temporarily from circuit in order that it may be reconnected in parallel with the other field. This is effected by first short-circuiting it (position 4') and then breaking the short circuit, (position 4².) The next running step is that shown at position 6, in which motor No. 2 is shunted by the armature of motor No. 1. This position gives a considerable increase in speed over position 5, since the armatures are now in parallel, but undue acceleration is prevented by reason of the fact that the field of motor No. 1 is in series not only with its own armature, but also with motor No. 2. This arrangement also prevents armature No. 1 from taking an undue proportion of current, since it has a high counter electromotive force, due to the strength of its field. To pass from position 5 to position 6 without entirely opening the motor-circuit and without introducing wasteful external resistance and at the same time to avoid objectionable circuit conditions is one of the main problems solved by my invention. The chief difficulty presented by this transition consists in the fact that it is necessary to change the armatures from series to parallel relation at a time when they are carrying considerable current and have attained a considerable speed. To do this, it is of course necessary to open the circuit through one of the armatures. The most obvious way of doing this is to short-circuit and then remove the armature from circuit after having first killed or removed its field. This, however, is not feasible in practice, for the reason that the ordinary throw of the controller-handle is made with such rapidity that the opened field does not have time to lose its residual magnetism before the armature is short-circuited, and the motor momentarily acts as a generator in a closed local circuit, causing it to "buck" or flash severely at the brushes. Other circuit changes tried by me have also proven objectionable, either as causing difficulty in the motors or undue arcing in the controller. I have therefore devised the steps herein shown, wherein the circuit of one of the fields (see position $5'$) is temporarily opened, and the field is then reconnected in shunt to the other motor. (See position $5^2$.) Immediately following this the circuit through the shunted motor is opened, (see position $5^3$,) and the connections of position 6 are established. By putting the field of one motor in shunt to the other motor as a whole, with the armature of the shunting-field in series therewith, comparatively little current will pass through the shunted motor, which can then be readily disconnected, the change in connections being effected without trouble in the motors or at the controller. The transition from the combination of position 6 to the full multiple position shown at position 7 is readily effected by again opening the circuit of motor No. 2, as indicated at position 6, and then connecting it in parallel with the other motor.

Any suitable type of controller may be employed for carrying out my improved system of control. I prefer, however, to employ a controller of the usual type, such as shown in Fig. 1. In this figure C represents a development of a rotary drum upon which are mounted a plurality of contacts (designated by the reference characters $c\,c'\,c^2$, &c., to and including $c^{27}$) which are engaged in different positions of the drum by the stationary contact-fingers, (marked F F' $F^2$, &c., to $F^{12}$.) The broken vertical lines on the drum development C indicate the several positions of the drum corresponding to the motor combinations shown in Fig. 2.

RS designates a combined reverse and cut-out switch of well-known type having a plurality of movable contacts $z$ and fixed contact-fingers S to $S^{12}$, inclusive. This switch is shown only for the purpose of illustrating the motor-circuits complete, and in tracing the circuits it will be sufficient to consider the fingers S to $S^{12}$ as resting on the contacts $z$ to $z^9$ on the vertical line marked ahead. The arrangement and electrical connections of the contacts, together with the various circuit connections, are clearly shown in Fig. 1 and need not be described.

T indicates the trolley connection, and G the ground connections, the upper group of contacts $c$ being grounded through the shaft of the controller.

At position 1 the circuit is as follows: from trolley connection T to finger $F^{12}$, to contacts $c^{27}\,c^{26}$, to finger $F^{11}$, finger $S^{12}$, contact $z^9$, finger $S^{11}$, armature $Ar'$, finger $F^8$, contacts $C^{19}\,c^{20}$, fingers $F^9\,S^9$, contact $z^8$, finger $S^{10}$, armature $Ar^2$, finger $F^7$, contacts $c^{14}\,c^{13}$, fingers $F^6\,S^8$, contacts $z^7\,z^5$, finger $S^6$, field $F^2$, finger $S^7$, contacts $z^6\,z^4$, fingers $S^5\,F^4$, contacts $c^8\,c^9$, fingers $F^5\,S'$, contacts $z\,z^2$, finger $S^3$, field $Fe'$, finger $S^2$, contacts $z\,z^3$, fingers $S^4\,F^3$, contacts $c^7\,c^6$ to finger $F^2$, and through the resistance R to ground.

Positions 2 and 3 simply short-circuit successive sections of the resistance R by the engagement, respectively, of the grounded contacts $c\,c'$ by the fingers F and $F'$, and at position 4 the entire resistance is short-circuited by the finger $F^3$ engaging the contact $c^2$.

At position $4'$ the contact-finger $F^5$ laps over onto the contact $c^{12}$ and momentarily short-circuits the field $Fe^2$, which is immediately thereafter open-circuited by the finger $F^4$, leaving the contact $c^8$ at position $4^2$. The other circuit connections remain as before.

At position 5 the series connections of the armatures remain as before. The engagement of finger $F^4$ with the contact $c^4$ reconnects the field $Fe^2$ in series with the armatures, while the continued engagement of the finger $F^5$ with contact $c^{12}$ connects field $Fe'$ in parallel with field $Fe^2$.

At position $5'$ the only change effected is that fingers $F^6$ and $F^3$ have left the respective contacts $c^{12}\,c^2$, which opens the circuit of field $Fe'$ at both terminals thereof, giving two breaks in series.

At position $5^2$ the finger $F^8$ is lapping both contacts $c^{19}$ and $c^{21}$ and the fingers $F^3$ and $F^5$ touch the respective contacts $c^3$ and $c^{11}$. The current after passing through armature $Ar'$ will therefore divide between the contacts $c^{20}$ and $c^{21}$, one part going by finger $F^9$ to finger $S^9$, contact $z^8$, finger $S^{10}$, armature $A^2$, finger $F^7$, contacts $c^{14}\,c^{13}$, fingers $F^6\,S^8$, contacts $z^7\,z^5$, finger $S^6$, field $Fe^2$, finger $S^7$, contacts $z^6\,z^4$, fingers $S^5\,F^4$ to grounded contact $c^4$. The other path is by contact $c^{21}$ to contact $c^{11}$, to fingers $F^5\,S'$, to contacts $z\,z^2$, finger $S^3$, field $Fe'$, finger $S^2$, contacts $z'\,z^3$, finger $S^4$, finger $S^3$ to grounded contact $c^3$.

At position $5^3$ the fingers $F^4$, $F^6$, $F^7$, $F^8$, and $F^9$ have left the respective contacts $c^4\,c^{13}\,c^{14}\,c^{19}\,c^{20}$ and fingers $F^3\,F^5$ and $F^8$, $F^{11}$, and $F^{12}$ are engaging, respectively, contacts $c^3\,c^{11}\,c^{21}\,c^{26}\,c^{27}$. This, it will be seen, leaves motor No. 1 in circuit and breaks the circuit of motor No 2 at three different points—viz., between contacts $c^{20}\,c^{22}$, between contacts $c^{14}$ and $c^{17}$, and between contacts $c^{13}$ and $c^{15}$.

At position 6 all the contact engagements of position $5^3$ are preserved, and in addition contacts $c^{10}$, $c^{15}$, $c^{17}$, $c^{22}$, and $c^{24}$ are also engaged by the respective fingers $F^4$, $F^6$, $F^7$, $F^9$, and $F^{10}$. The current now divides between the contacts $c^{26}$ and $c^{24}$, one part going by fingers $F^{11}$ $S^{12}$, contact $z^9$, and finger $S^{11}$ to armature $Ar'$, thence to finger $F^8$, contact $c^{21}$, contact $c^{11}$, finger $E^5$, finger $S'$, contacts $z$ $z^2$, through field $Fe'$ to contacts $z'$ $z^3$, fingers $S^4$ $F^3$ to grounded contact $c^3$. The other path is from contacts $c^{24}$ $c^{22}$ to fingers $F^9$ $S^9$, contact $z^8$, finger $S^{10}$, armature $Ar^2$, finger $F^7$, contacts $c^{17}$ $c^{15}$, fingers $F^6$ $S^8$, contacts $z^7$ $z^5$, to and through field $Fe^2$ to contacts $z^6$ $z^4$, fingers $S^5$ $F^4$ to contacts $c^{10}$ $c^{11}$, when it unites with the first path.

At position $6'$ the connections are precisely the same as at position $5^3$, the circuit through motor No. 2 being opened at a number of points in series.

At position 7 the circuit is as follows: from T to contacts $c^{27}$ $c^{26}$, the current dividing as before, one part going by $F^{11}$, $S^{12}$, $z^9$, $Ar'$, $F^8$, $c^{21}$, $c^{11}$, $F^5$, $S'$, $z$, $z^2$, $Fe'$, $S^3$, $z'$, $z^3$, $S^4$, $F^3$ to grounded contact $c^3$, and the other part by $c^{24}$, $c^{23}$, finger $F^9$, $S^9$, $z^8$, $S^{10}$, $Ar^2$, $F^7$, $c^{18}$, $c^{16}$, $F^6$, $S^8$, $z^7$, $z^5$, $S^6$, $Fe^2$, $S^7$, $z^6$, $z^4$, $S^5$, $F^4$ to grounded contact $c^5$.

It will be obvious that the particular contact arrangement above described is merely illustrative and that various other arrangements may be employed. Neither do I wish to limit myself to unimportant details herein described for the purpose of presenting a complete working embodiment of my invention, since these may be changed without altering the character of the invention. I do not, however, claim herein, except in combination with the other steps, the motor combination or step shown at position 6, as I believe such combination or step to be the invention of Frank W. Garrett, of Johnstown, Pennsylvania, as described and claimed in his pending application for patent, Serial No. 28,324.

Having thus described my invention, what I claim, and desire to secure by Letters Patent, is—

1. The method of controlling a pair of electric motors, which consists in starting them from a position of rest connected in series with each other, then connecting their field-coils in parallel and in series with the series-connected armatures, then shunting one motor with the field of the other motor, then shunting one of the motors with the armature of the other motor, and finally connecting both motors in parallel.

2. The method of shifting a pair of electric motors from series to parallel relation, which consists in first changing the fields only from series to parallel, then shunting one motor with the field of the other motor, then shunting one motor with the armature of the other motor, and finally opening the circuit of the shunted motor and connecting it in parallel with the other motor.

3. The method of shifting a pair of electric motors from series to parallel relation, which consists in first changing the fields only from series to parallel, then opening the circuit of one of said fields and reconnecting it in circuit in shunt to the other motor, then opening the circuit of the shunted motor and shifting the connections to place said motor in parallel with the armature only of the other motor, and in series with the field thereof, and finally connecting both motors as a whole in parallel.

4. The method of shifting a pair of motors from series to parallel relation, which consists in first changing the fields only from series to parallel, then shunting one motor with the field of the other motor, then shunting it with the armature of the other motor, and finally connecting both motors in parallel.

5. The method of shifting a pair of motors from series to parallel relation, which consists in first changing the fields only from series to parallel, then without entirely opening the motor-circuit, changing the connections of the motors to place them in a relation in which one motor is shunted by the armature of the other motor, and then connecting both motors as a whole in parallel.

6. The herein-described method of changing a pair of motors from series to parallel relation, which consists in first changing the fields only from series to parallel, then shunting one motor with the field of the other motor, with the armature of the shunting-field still in series, then shunting the same motor with the armature of the other motor, with the field of the shunting-motor in series, and finally connecting both motors in parallel.

7. In the control of electric motors, the step which consists in shunting one motor with the field of the other motor.

8. In the control of two electric motors, the step which consists in connecting the armatures of both motors and the field of one motor all in series, with the same field and its corresponding armature shunted by the other field.

9. In the control of electric motors, the method of changing two motors from a relation in which their fields are in parallel with each other, and in series with their series-connected armatures, to a relation in which one motor is shunted by the armature-coils of the other motor, said method consisting in removing from circuit the field-coils of one motor, then connecting said coils as a shunt to the other motor, and then opening the circuit of the shunted motor and rearranging its connections to give the desired relation of the two motors.

In testimony whereof I have affixed my signature in presence of two witnesses.

FRANK A. MERRICK.

Witnesses:
CORA G. COX,
H. W. SMITH.